(12) United States Patent
Lee et al.

(10) Patent No.: US 11,783,559 B2
(45) Date of Patent: Oct. 10, 2023

(54) METHOD AND APPARATUS FOR PROCESSING PATTERN PIECES FOR FULLNESS OF CLOTHES

(71) Applicant: CLO Virtual Fashion Inc., Seoul (KR)

(72) Inventors: Hohyun Lee, Seoul (KR); Yeji Kim, Seoul (KR)

(73) Assignee: CLO Virtual Fashion, Inc., Seoul (KR)

( * ) Notice: Subject to any disclaimer, the term of this patent is extended or adjusted under 35 U.S.C. 154(b) by 0 days.

(21) Appl. No.: 17/722,702

(22) Filed: Apr. 18, 2022

(65) Prior Publication Data

US 2022/0237881 A1 Jul. 28, 2022

Related U.S. Application Data

(63) Continuation of application No. 17/107,446, filed on Nov. 30, 2020, now Pat. No. 11,308,708.

(30) Foreign Application Priority Data

| Jan. 28, 2020 | (KR) | .......................... 10-2020-0009974 |
| Feb. 25, 2020 | (KR) | .......................... 10-2020-0022889 |
| Mar. 2, 2020 | (KR) | .......................... 10-2020-0026107 |

(51) Int. Cl.
*G06T 19/20* (2011.01)
*G06F 3/0482* (2013.01)

(52) U.S. Cl.
CPC ............ *G06T 19/20* (2013.01); *G06F 3/0482* (2013.01); *G06T 2200/24* (2013.01); *G06T 2210/16* (2013.01); *G06T 2219/2016* (2013.01)

(58) Field of Classification Search
CPC . A41H 3/007; A41H 3/00; A41H 9/00; G06T 19/20; G06T 2200/24; G06T 2210/16; G06T 2219/2016; G06T 11/001; G06F 3/0482; G06F 2113/12; G06F 30/00; A41B 9/04; A41B 13/00
See application file for complete search history.

(56) References Cited

U.S. PATENT DOCUMENTS

| 4,926,344 | A | * | 5/1990 | Collins | .................. A41H 3/007 706/53 |
| 2004/0049309 | A1 | * | 3/2004 | Gardner | .................. A41H 1/00 700/132 |

(Continued)

FOREIGN PATENT DOCUMENTS

KR 10-2016-0128131 A 11/2016

OTHER PUBLICATIONS

United States Office Action, U.S. Appl. No. 17/107,446, dated Jul. 23, 2021, 31 pages.

*Primary Examiner* — Xilin Guo
(74) *Attorney, Agent, or Firm* — WTA Patents

(57) ABSTRACT

A method and apparatus for processing a pattern piece receives, as an input from a user, a selection of at least a portion of an outer line of a pattern piece to be processed among one or more pattern pieces included in a two-dimensional (2D) pattern of clothes, generates a template including a plurality of lines that divide an area set by the input, processes the template based on fullness settings set by the user for the pattern piece, processes the pattern piece based on the processed template, and outputs the processed pattern piece.

20 Claims, 8 Drawing Sheets

(56) References Cited

U.S. PATENT DOCUMENTS

2004/0153195 A1\* 8/2004 Watanabe ............ A41H 3/007
  700/132
2006/0278150 A1\* 12/2006 Roos ..................... A41H 3/00
  112/475.19
2014/0360030 A1 12/2014 Grove \* cited by examiner

METHOD AND APPARATUS FOR PROCESSING PATTERN PIECES FOR FULLNESS OF CLOTHES

CROSS-REFERENCE TO RELATED APPLICATIONS

This application is a continuation of U.S. patent application Ser. No. 17/107,446 filed on Nov. 30, 2020, which claims the benefit of Republic of Korea Patent Application No. 10-2020-0009974 filed on Jan. 28, 2020, Republic of Korea Patent Application No. 10-2020-0022889 filed on Feb. 25, 2020, and Republic of Korea Patent Application No. 10-2020-0026107 filed on Mar. 2, 2020, the entire disclosures of which are incorporated herein by reference for all purposes.

BACKGROUND

1. Field of the Invention

One or more example embodiments relate to a method and apparatus for processing pattern pieces for fullness of clothes.

2. Description of the Related Art

Clothes appear in three dimensions when worn on a person's body, but they are more in two dimensions because they are actually a combination of pieces of fabric cut according to a two-dimensional (2D) pattern. Since fabric which is a material for clothes is flexible, it may be varied in appearance from moment to moment according to a body shape or motion of a person who wears it. For example, clothes worn on a body may slip down or become wrinkled and folded by gravity, wind, or collisions with the body. A form in which clothes slip down or are wrinkled may vary according to a physical property of fabric used, and it may thus be difficult to simulate clothes made with a flexible material such as fabric to look similar to an actual three-dimensional (3D) form.

SUMMARY

An aspect provides a method of applying fullness set by a user to a pattern piece corresponding to at least a portion of clothes, for example, a lower edge of a skirt and a cuff.

An aspect provides a method of representing fullness in an entirety or a middle of a line on at least a side of a pattern piece according to user settings, or outputting a pattern piece processed by adding or reducing a line for fullness according to user settings.

An aspect provides a method of applying and/or representing fullness in various directions, for example, in a left direction, in a right direction, and in both directions, according to user settings.

An aspect provides a method of processing a pattern piece based on a template generated based on an outer line of at least a portion of the pattern piece selected by a user, thereby providing a pattern piece that represents fullness with a more accurate intention of the user reflected.

An aspect provides a method of providing a preview of a shape of a pattern piece corresponding to a processed template before processing the pattern piece, thereby allowing a user to verify a shape of a pattern piece to be finally obtained through the processing.

An aspect provides a method of visually displaying an outer shape (e.g., line, dot, shape) of a pattern piece on a screen in a form of a preview before processing the pattern piece into a final pattern piece, and altering the pattern piece to be suitable to fullness intended by a user.

According to an aspect, there is provided a method of processing a pattern piece, the method including receiving, as an input from a user, a selection of at least a portion of an outer line of a pattern piece to be processed among one or more pattern pieces included in a two-dimensional (2D) pattern of clothes, generating a template including a plurality of lines that divide an area set in the pattern piece by the input, processing the template based on fullness settings set by the user for the pattern piece, processing the pattern piece based on the processed template, and outputting the processed pattern piece.

The processing of the template may include determining a scale value of the lines based on the fullness settings, determining a rotation value of the lines based on the fullness settings and the scale value, and processing the lines based on the scale value and the rotation value.

The determining of the scale value may include determining, to be the scale value, a smaller value between a first setting of the fullness settings for processing a first side of the area and a second setting of the fullness settings for processing a second side of the area. The determining of the rotation value may include determining, to be the rotation value, a difference between the scale value and a greater value between the first setting and the second setting.

The processing of the lines may include adjusting an interval between the lines based on the scale value, and rotating the lines based on the rotation value using, as a pivot point, end points of a side corresponding to the smaller value between the first setting and the second setting.

The generating of the template may include generating a temporary guide based on the input, dividing the temporary guide, and generating the lines included in the template by adjusting dividing lines that divide the temporary guide to be suitable to an outer shape of the pattern piece.

The receiving of the input may include receiving, as an input from the user, a selection of at least two first points of a first line corresponding to a first side of the pattern piece, and receiving, as an input from the user, a selection of at least two second points of a second line corresponding to a second side of the pattern piece.

The first side and the second side may be sides facing each other in the pattern piece.

The first line may correspond to at least a portion of the first side, and the second line may correspond to at least a portion of the second side.

The dividing of the temporary guide may include dimidiating the temporary guide repeatedly until a width of each of pieces of the temporary guide becomes greater than or equal to a preset length.

The processing of the pattern piece may include determining an outer line of the processed pattern piece based on end points of lines included in the processed template.

The fullness settings may include at least one of a length of a first line of the pattern piece, a first movement distance with respect to the length of the first line, a length of a second line of the pattern piece, a second movement distance with respect to the length of the second line, or a direction in which fullness is applied to the pattern piece.

The length of the first line may be linked with the first movement distance, and the length of the second line may be linked with the second movement distance.

The method may further include providing a preview of a shape of the processed pattern piece to be obtained through the processing, before determining the processing of the pattern piece.

The pattern piece may be modeled with a polygon mesh including a plurality of polygons.

According to another aspect, there is provided an apparatus for processing a pattern piece, the apparatus including a user interface (UI) configured to receive, as an input from a user, a selection of at least a portion of an outer line of a pattern piece to be processed among one or more pattern pieces included in a 2D pattern of clothes, a processor configured to generate a template including a plurality of lines that divides an area set in the pattern piece by the input, process the template based on fullness settings set by the user for the pattern piece, and process the pattern piece based on the processed template, and an output device configured to output the processed pattern piece.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
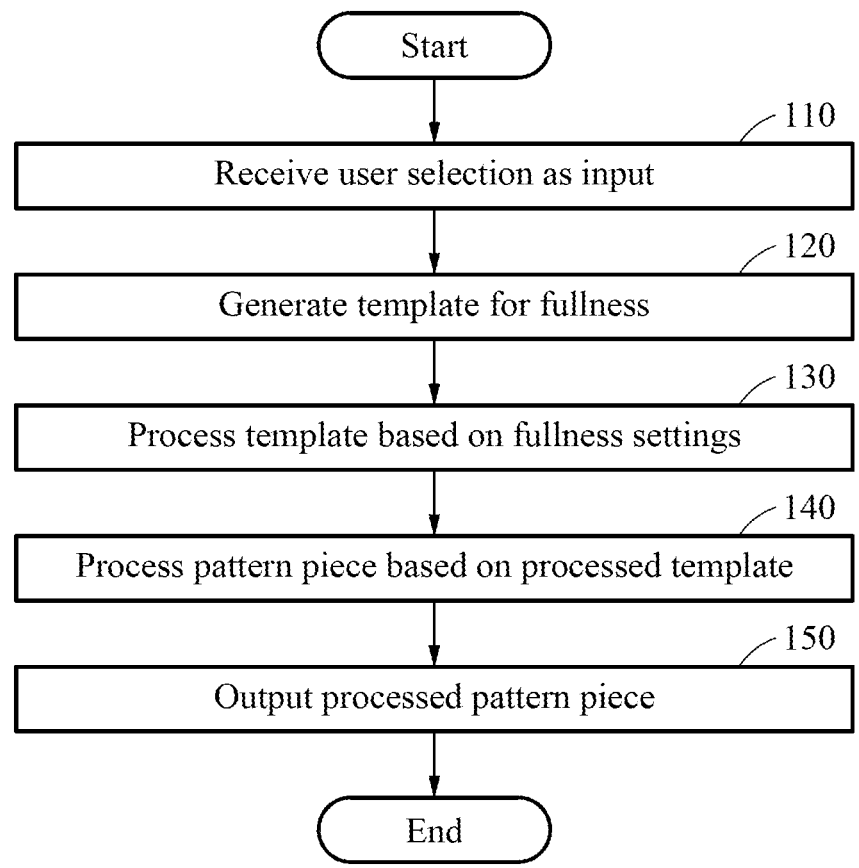
FIG. 1 is a flowchart illustrating an example of a method of processing a pattern piece according to an example embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is for the purpose of describing particular examples only and is not intended to limit the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing example embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the examples described herein and an element having a common function. Unless otherwise mentioned, the descriptions of the examples may be applicable to the following examples, and thus duplicated and redundant descriptions will be omitted for conciseness.

FIG. 1 is a flowchart illustrating an example of a method of processing a pattern piece according to an example embodiment. Hereinafter, a method of processing a pattern piece will be simply referred to as a pattern piece processing method. Referring to FIG. 1, in operation 110, an apparatus for processing a pattern piece (hereinafter simply a "processing apparatus") receives, as an input from a user, a selection of at least a portion of an outer line of a pattern piece to be processed among one or more pattern pieces included in a two-dimensional (2D) pattern of clothes. The processing apparatus may receive, as the input, the selection made by the user on the outer line of the pattern piece through a user interface (UI) (e.g., a UI 810 of FIG. 8). The input corresponding to the selection of the portion of the outer line may include, for example, an input made by the user by selecting a plurality of points from the outer line, an input made by the user by selecting one of outer lines, or a combination thereof. Hereinafter, for the convenience of description, the input corresponding to the selection of the portion of the outer line is the input of selecting a plurality of points from the outer line. However, examples of the input are not limited thereto, and example embodiments described herein may also be applicable to other types of input.

Figure 2:
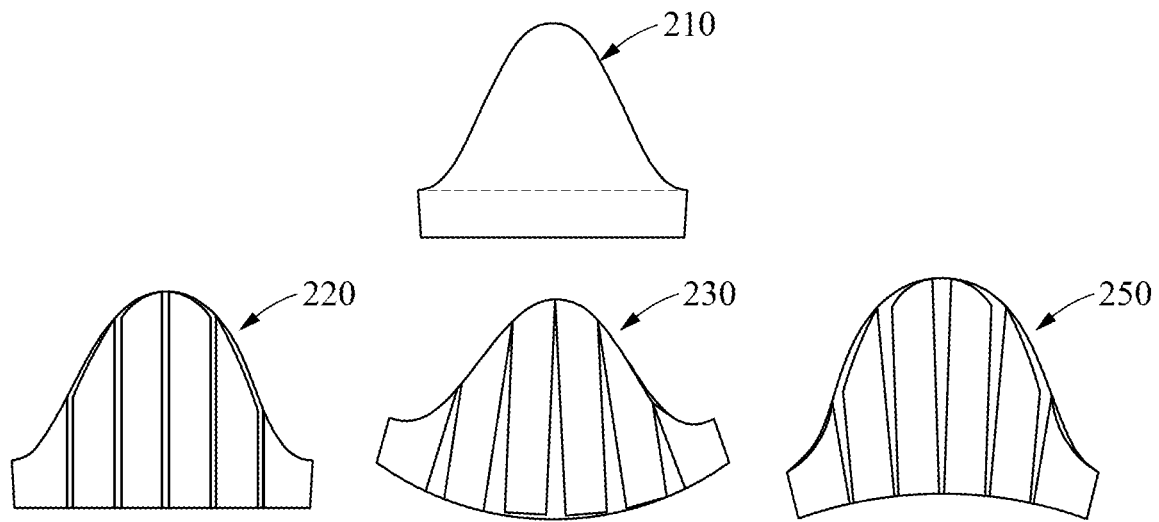
FIG. 2 is a diagram illustrating an example of a pattern piece to be processed for fullness according to an example embodiment.

The pattern piece from which the portion (e.g., a plurality of points) of the outer line is selected as the input in operation 110 may correspond to a target pattern piece to which fullness is to be applied. Fullness described herein refers to a technique of processing fabric or a 2D pattern to represent a portion or an entirety of clothes as being fluffy or inflated, and is used to, for example, fluff at least a portion of a cuff or inflate a lower edge of a skirt or a skirt part of a dress. An example of the pattern piece to be processed for fullness is illustrated in FIG. 2.

The 2D pattern described herein may be a virtual 2D pattern modeled to simulate virtual three-dimensional (3D) clothes. The 2D pattern may include a plurality of pattern pieces, for example, cuffs, a back piece, a front piece, and the like. The pattern pieces may be modeled with a polygon mesh to be simulated as being draped over a body of a 3D avatar. The polygon mesh may include a plurality of polygons. The polygon mesh may be modeled in various manners. For example, vertices of a polygon included in the polygon mesh may be point masses having mass, and sides of the polygon may be represented as springs having elasticity that connect the point masses. Thus, the 2D pattern may be modeled by a mass-spring model, for example. The springs may have respective resistance values against, for example, stretch, shear, and bending, depending on a material property of fabric used. Alternatively, the polygon mesh may be modeled by a strain model. The polygons included in the polygon mesh may be modeled as triangles or polygons with four or more angles. For example, in a case of modeling a 3D volume, the polygon mesh may be modeled with a 3D polyhedron.

In operation 120, the processing apparatus generates a template for fullness based on the input of the selected portion (e.g., the selected points) of the outer line of the pattern piece. The template described herein refers to a virtual medium that reflects user settings set by the user to apply fullness to the pattern piece. For example, the processing apparatus may generate the template including a plurality of lines that divides an area set in the pattern piece by the selected points.

In an example, the processing apparatus may generate a temporary guide based on the input (e.g., the points). The temporary guide may be a polygon (e.g., a tetragon) formed by the points selected by the user from the pattern piece. The processing apparatus may divide the temporary guide. In such a case, intervals among pieces that divide the temporary guide may be equal. The pieces of the temporary guide may be generated by repeatedly dimidiating the temporary guide. For example, the processing apparatus may repeatedly dimidiate the temporary guide until a width of each of the pieces of the temporary guide is not less than (or is greater than or equal to) a preset length (e.g., 1 millimeter [mm]). The processing apparatus may then generate the lines included in the template by adjusting dividing lines that divide the temporary guide to be suitable to an outer shape of the pattern piece. The generating of the template by the processing apparatus will be described in detail with reference to FIG. 3A.

In operation 130, the processing apparatus processes the template based on fullness settings set by the user for the pattern piece. The processing apparatus may receive, as an input, the fullness settings set by the user for the pattern piece, and process the template by applying the fullness settings to the template.

The fullness settings set by the user for the pattern piece may include, for example, at least one of a length of a first line of the pattern piece, a first movement distance with respect to the length of the first line, a length of a second line of the pattern piece, a second movement distance with respect to the length of the second line, or a direction in which fullness is applied to the pattern piece. The length of the first line may be linked with the first movement distance, and the length of the second line may be linked with the second movement distance. Here, the term "the length of the first line being linked with the first movement distance" may indicate that, for example, when a length of a first line is 20 centimeters (cm) and a first movement distance is +5 cm, a final length of the first line becomes 25 cm as the first movement distance (+5 cm) is applied to the length (20 cm) of the first line. The foregoing may also be applied to a relationship between the length of the second line and the second movement distance.

The direction in which fullness is applied to the pattern piece may be a direction of processing the pattern piece. For example, fullness may be applied to one side of the pattern piece, with another side of the pattern piece being fixed. Alternatively, fullness may be applied to at least a side of the pattern piece, that is, one side of the pattern piece or both sides of the pattern piece. The direction in which fullness is applied to the pattern piece may also indicate a side of the pattern piece on which fullness is to be represented, for example, indicating whether fullness is to be applied to one side of the pattern piece or both sides of the pattern piece. For example, the direction in which fullness is applied to the pattern piece may be used to distinguish a case in which a vertical-direction fullness representation is required as in a case of an A-line skirt that becomes fluffier or inflated from top to bottom, and a case in which a horizontal-direction fullness representation is required.

Figure 4:
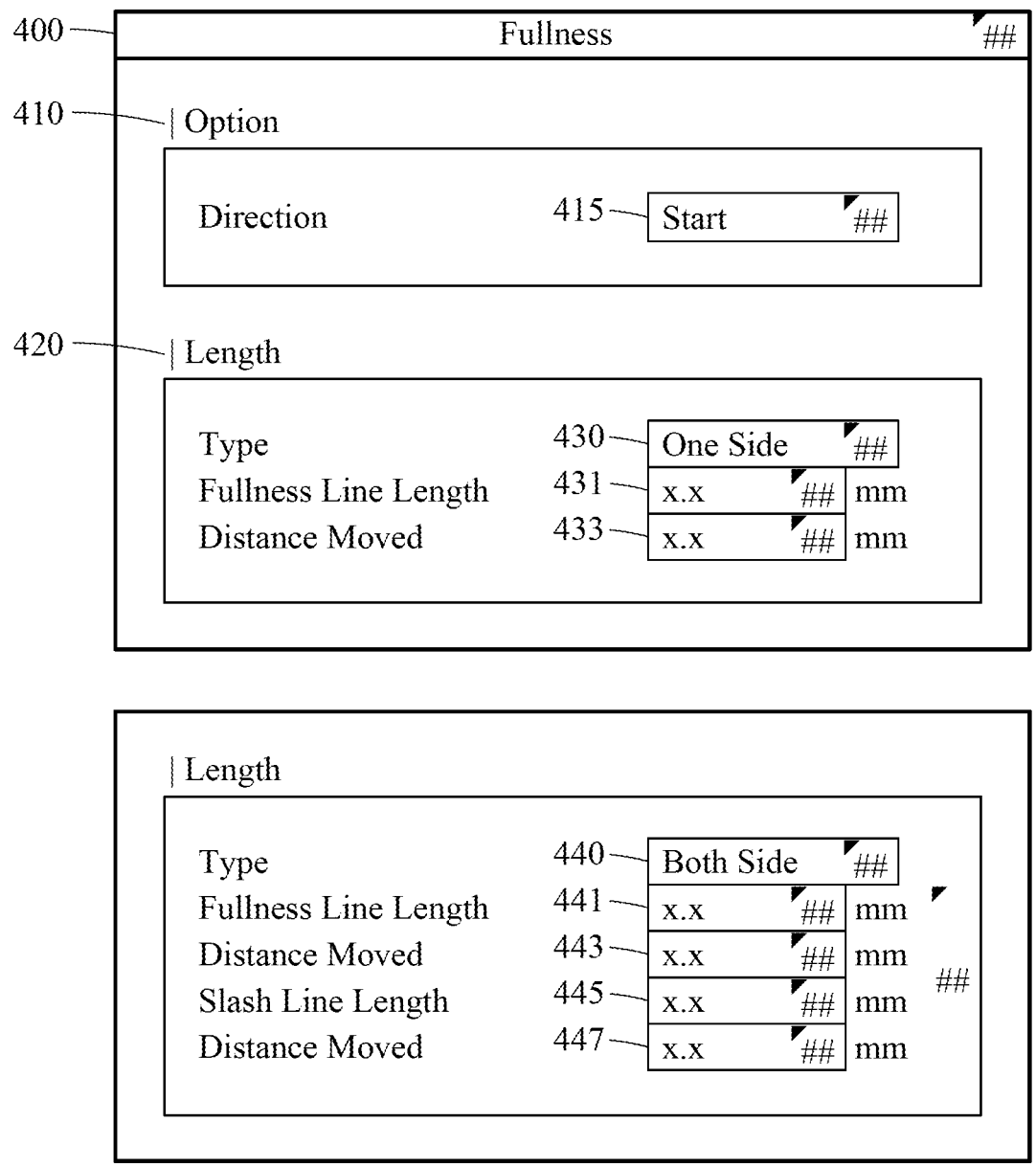
FIG. 4 is a diagram illustrating an example of a user interface (UI) screen for inputting user settings for fullness according to an example embodiment.

The fullness settings set by the user for the pattern piece may be input through a UI screen 400 illustrated in FIG. 4, for example.

To process the template, the processing apparatus may determine a scale value of the lines based on the fullness settings. The scale value of the lines may be a parameter for adjusting an interval between the lines. The processing apparatus may determine a rotation value of the lines based on the fullness settings and the scale value. The rotation value of the lines may be a parameter for rotating end points on an opposite side, with end points on one side of the lines being fixed. The processing apparatus may process the template by processing the lines based on the scale value and the rotation value.

In an example, the processing apparatus may determine, to be the scale value, a smaller value between a first setting (e.g., the first movement distance) of the fullness settings for processing a first side and a second setting (e.g., the second movement distance) of the fullness settings for processing a second side. The processing apparatus may determine, to be the rotation value, a difference between the scale value and a greater value between the first setting and the second setting.

The processing apparatus may adjust the interval between the lines based on the scale value and rotate the lines based on the rotation value. The processing of the template by the processing apparatus based on the fullness settings set by the user will be described in detail with reference to FIG. 3B.

In operation 140, the processing apparatus processes the pattern piece based on the template processed in operation 130. In an example, the processing apparatus may determine an outer line of the processed pattern piece based on end points of lines included in the processed template, thereby providing a pattern piece in which fullness is represented with an intention of the user reflected more accurately.

In an example, before determining the processing of the pattern piece in operation 140, the processing apparatus may provide a preview of a shape of the processed pattern piece to be obtained through the processing in operation 140 on a screen. In an example, a function of visually displaying an outer shape of the pattern piece in a form of the preview on the screen before the pattern piece is finally processed is referred to herein as a ghost function. Through the ghost function, the user may verify the shape of the pattern piece to be finally obtained through the processing, and alter the pattern piece to be suitable to fullness intended by the user. Here, because texture is not applied to the shape of the pattern piece provided in the form of the preview, it is possible to reduce a computational complexity for the ghost function.

In operation 150, the processing apparatus outputs the processed pattern piece obtained through the processing in operation 140. The processing apparatus may display the processed pattern piece on a screen, or print out the processed pattern piece on a sheet of paper or fabric outside the processing apparatus.

FIG. 2 is a diagram illustrating an example of a pattern piece to be processed for fullness according to an example embodiment. In the example of FIG. 2, illustrated are a pattern piece 210 corresponding to a cuff portion of clothes of a 2D pattern, and pattern pieces 220, 230, and 250 processed through a fullness function.

In an example, an area in a pattern piece that is covered by a template may vary depending on an input made by a user on an outer line of the pattern piece, for example, positions of points selected by the user from the outer line of the pattern piece.

A processing apparatus may receive, as an input from the user, a selection of a plurality of points (e.g., four points) from the pattern piece 210 through a UI. For example, the user may select a menu for applying fullness to the pattern piece 210 that is displayed on a screen. The menu for applying fullness may be provided in a form of a drop-down menu.

When the user selects a "select line" button from the menu for applying fullness, a phrase guiding the user to make a selection from a first line corresponding to a first side of the pattern piece 210 may be displayed on the screen. In such a case, the phrase may be, for example, "click on start and end points to select the fullness line." As per the phrase, the user may select at least two first points on the first line corresponding to a curved line at an upper end of the pattern piece 210. The at least two first points may include, for example, a start point of the first line and an end point of the first line, or a start point and an end point in a middle portion of the first line.

The first line is also referred to herein as a fullness line because it is a line selected first by the user for fullness. Thus, the first line and the fullness line may be construed as being identical. The first line may correspond to at least a portion of a line of the first side. For example, the first line may be an entire line of the first side, or a middle portion, a right-side portion, or a left-side portion of the line of the first side.

When the user completes the selecting with respect to the first line, a phrase guiding the user to make a selection from a second line corresponding to a second side of the pattern piece 210 may be displayed on the screen. In such a case, the phrase may be, for example, "click on start and end points to select the slash line." As per the phrase, the user may select at least two second points (e.g., start and end points) on a second line corresponding to a flat portion at a lower end of the pattern piece 210. The second line may be selected secondly by the user for fullness. The second line is also referred to herein as a slash line because the second line corresponds to a lower portion of the pattern piece 210 compared to the first line, and based on, for example, a general notion that a lower end of a pattern piece is represented as more fully or fluffy as in a lower end of a skirt. Thus, the second line and the slash line may be construed as being identical. Here, slash may indicate an ornamentation technique found in garments in the Renaissance to slash a portion of clothes to show underwear.

For the convenience of description, it is described herein that a first line corresponds to an upper portion of a pattern piece and a second line corresponds to a lower portion of the pattern piece. However, examples are not limited thereto. For example, the first line may correspond to the lower portion of the pattern piece and the second line may correspond to the upper portion of the pattern piece.

The first side and the second side may be sides facing each other in the pattern piece 210, for example, top and bottom sides, or left and right sides.

An accurate length of the first line and/or the second line selected by the user as described above may be displayed through a UI screen, for example, a UI screen 400 illustrated in FIG. 4. Thus, the user may verify the displayed length, and reduce or expand the length of the first line and/or the second line.

The processing apparatus may generate a template for fullness based on the four points selected by the user from the pattern piece 210. The processing apparatus may generate a processed template by applying fullness settings set by the user to the template through the UI screen, for example, the UI screen 400 illustrated in FIG. 4.

For example, in a case in which the user desires to inflate both the upper portion and the lower portion of the pattern piece 210 corresponding to the cuff, the processing apparatus may process the pattern piece 210 into the pattern piece 220 such that fullness is represented in both the upper portion and the lower portion of the cuff based on the processed template. Although to be described hereinafter, the processed template may be a template to which a scale is applied.

For another example, in a case in which the user desires to inflate the lower portion of the pattern piece 210 corresponding to the cuff, the processing apparatus may process the pattern piece 210 into the pattern piece 230 such that fullness is represented in the lower portion of the cuff based on the processed template. For still another example, in a case in which the user desires to inflate the upper portion of the pattern piece 210, the processing apparatus may process the pattern piece 210 into the pattern piece 250 such that fullness is represented in the upper portion of the cuff based on the processed template. Although to be described hereinafter, the processed template may be a template to which a rotation is applied or both a scale and a rotation are applied.

The generating of a template by the processing apparatus will be described in detail with reference to FIG. 3A, and the processing of a template by the processing apparatus will be described in detail with reference to FIG. 3B.

Figure 3A:
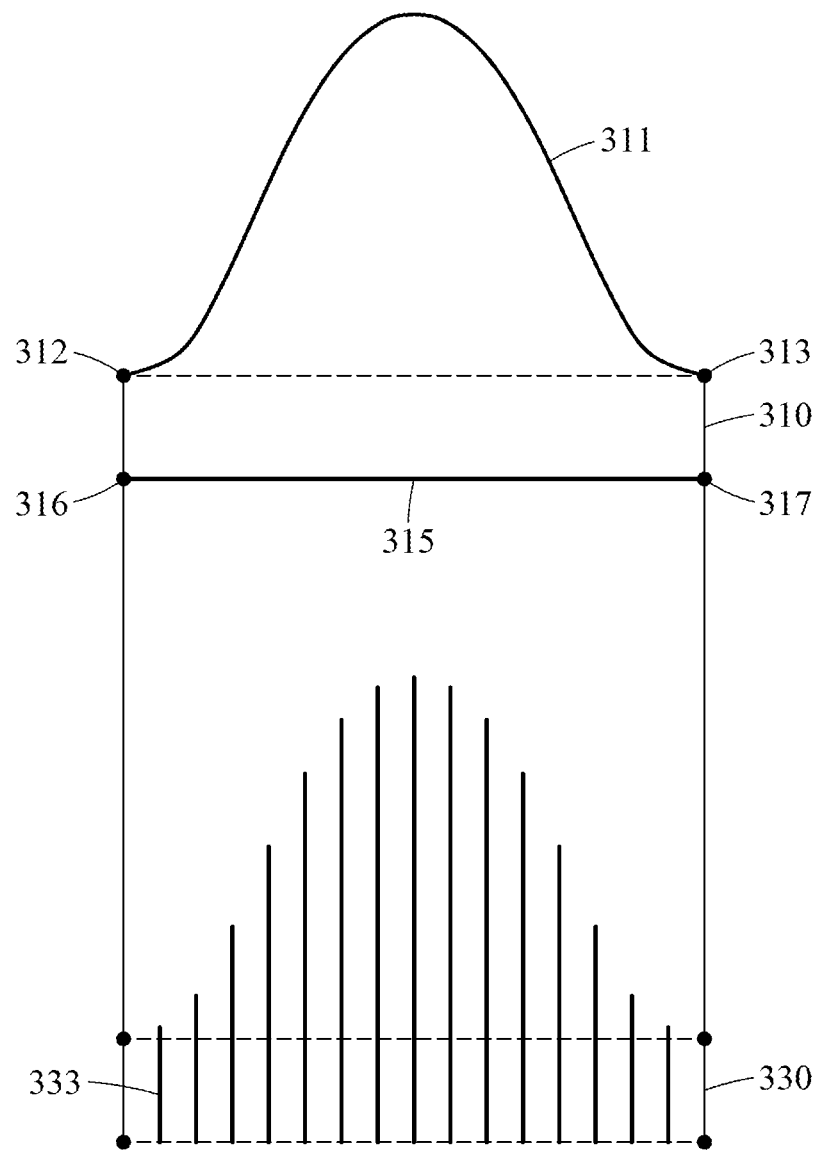
FIG. 3A is a diagram illustrating an example of generating a template for fullness according to an example embodiment.

FIG. 3A is a diagram illustrating an example of generating a template for fullness according to an example embodiment. In the example of FIG. 3A, illustrated are a pattern piece 310 and a temporary guide 330 generated based on a plurality of points 312, 313, 316, and 317 selected from the pattern piece 310.

Referring to FIG. 3A, a processing apparatus may receive, as an input, at least two first points 312 and 313 selected by a user from a first line 311 of the pattern piece 310 and at least two second points 316 and 317 selected by the user from a second line 315 of the pattern piece 310, through the process described above with reference to FIG. 2. Although it is illustrated that the four points are selected from the lines of the pattern piece 310 for the convenience of description, examples are not limited thereto. For example, the processing apparatus may receive, as an input, six or eight points.

The processing apparatus may generate the temporary guide 330 based on the first points 312 and 313 and the second points 316 and 317. For example, the processing apparatus may generate the temporary guide 330 of a tetragonal shape that is formed by the first points 312 and 313 and the second points 316 and 317. For example, the processing apparatus may generate dividing lines 333 by dimidiating the temporary guide 330 until a width of each of pieces of the temporary guide 330 is not less than a preset length (e.g., 1 mm or 5 mm).

The processing apparatus may match end points on one side of the dividing lines 333 that divide the temporary guide 330 to the first line 311 of the pattern piece 310 and match end points on another side of the dividing lines 333 to the second line 315 of the pattern piece 310, thereby generating a plurality of lines to be included in a template as illustrated in a lower portion of FIG. 3A.

Figure 3B:
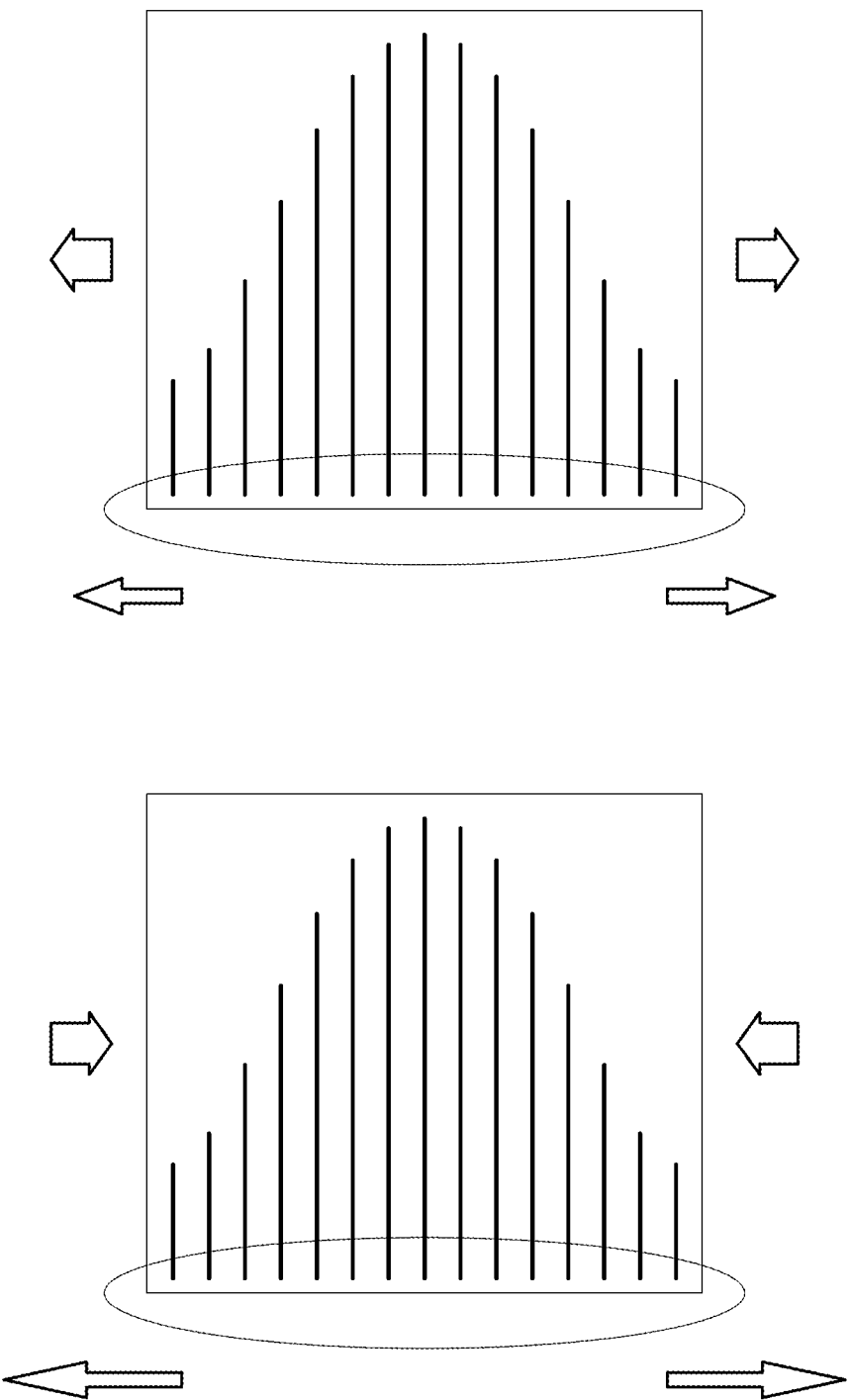
FIG. 3B is a diagram illustrating an example of processing a template for fullness according to an example embodiment.

FIG. 3B is a diagram illustrating an example of processing a template for fullness according to an example embodiment. Referring to FIG. 3B, a processing apparatus may determine a scale value and a rotation value based on fullness settings set by a user.

For example, referring to an upper portion of FIG. 3B, of the fullness settings set by the user, a first movement distance of a first line may be set as +100, and a second movement distance of a second line may be set as +200. In this example, a processing apparatus may determine, to be a scale value, a smaller value between the first movement distance and the second movement distance (or a movement distance that is commonly applied to the first movement distance and the second movement distance). In the example, the smaller value is +100. The processing apparatus may uniformly increase intervals between a plurality of lines included in a template such that a scale corresponding to +100 is applied entirely.

In addition, the processing apparatus may determine, to be a rotation value, a difference between a greater value (+200) between the first movement distance and the second movement distance and the scale value (+100). In the example, the difference is +100. Here, since the rotation value needs to be applied to the second line, end points corresponding to the first line may be used as a pivot point on which the lines may rotate. The processing apparatus may fix, as the pivot point, the end points corresponding to the first line of the lines to which the scale is applied, and rotate end points corresponding to the second line of the lines.

Through the scale and the rotation described above, +100 fullness may be applied to the first line, and +200 fullness may be applied to the second line.

For another example, referring to a lower portion of FIG. 3B, of the fullness settings set by the user, a first movement distance of a first line may be set as −100, and a second movement distance of a second line may be set as +100. In this example, the processing apparatus may determine, to be a scale value, a smaller value between the first movement distance and the second movement distance (or a movement distance that is commonly applied to the first movement distance and the second movement distance). In the example, the smaller value is −100. The processing apparatus may uniformly decrease intervals between a plurality of lines included in a template such that a scale corresponding to −100 is applied entirely.

In addition, the processing apparatus may determine, to be a rotation value, a difference between a greater value (+100) between the first movement distance and the second movement distance and the scale value (−100). In the example, the difference is +200. Here, since the rotation value needs to be applied to the second line, end points corresponding to the first line may be used as a pivot point on which the lines may rotate. The processing apparatus may fix, as the pivot point, the end points corresponding to the first line of the lines to which the scale is applied, and rotate end points corresponding to the second line of the lines.

Through the scale and the rotation described above, −100 fullness may be applied to the first line, and +100 fullness may be applied to the second line.

Although not illustrated, according to the fullness settings, the first line may increase, and the second line may decrease. Alternatively, both the first line and the second line may increase or decrease.

A plurality of points input by a user may set a portion of a first line or a portion of a second line. Thus, a fullness function may be applied only to a corresponding area in a pattern piece. In such a case, the fullness function may not be applied to another area, except the corresponding area in the pattern piece, and a shape of the other area may appropriately move and rotate without being processed as the corresponding area is processed.

The processing apparatus may process a pattern piece based on a processed template. For example, the processing apparatus may determine an outer line of the processed pattern piece based on end points of lines included in the processed template. In such an example, the pattern piece may be processed into, for example, the pattern pieces 220, 230, and 250 illustrated in FIG. 2.

FIG. 4 is a diagram illustrating an example of a UI screen for inputting user settings for fullness according to an example embodiment. In the example of FIG. 4, illustrated is a UI screen 400.

The UI screen 400 includes an option item 410 for setting a pattern piece generating direction, that is, a direction in which fullness proceeds in a pattern piece, and a length item 420 for setting a side of the pattern piece for which fullness is represented and setting a length of the pattern piece.

For example, when a user completes selecting a start point and an end point on a line of a pattern piece, the UI screen 400 may be displayed on a screen. The user may set a direction indicating a pattern piece generating direction through a direction combo box 415 included in the option item 410. When the user clicks the direction combo box 415, a drop-down menu indicating the pattern piece generating direction, for example, Start, End, and Both, may be displayed on the screen. For example, when a direction selected from the combo box 415 corresponds to a half symmetric pattern, a direction opposite to a center axis may be set as a default for the pattern piece generating direction, and the direction menu may be inactivated.

Figure 5:
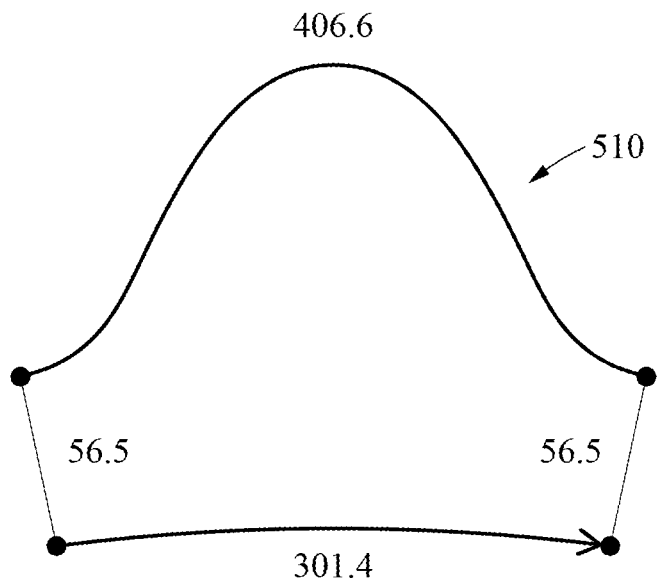
FIG. 5 is a diagram illustrating examples of results obtained by varying a direction in which fullness proceeds in a pattern piece based on user settings according to an example embodiment.
Figure 5:
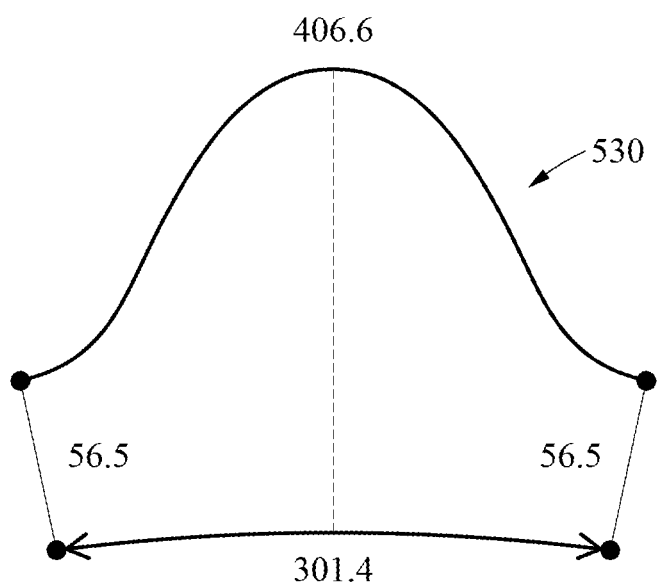

For example, in a case in which the user selects Start or End, or selects Both, from the direction combo box 415, a result of generating the pattern piece may vary according to each selected direction. Examples of the result are illustrated in FIG. 5.

Through the length item 420 of the UI screen 400, the user may set a side of the pattern piece to which fullness is to be applied, for example, a fullness type, each line length based on the fullness type, a distance moved with respect to each line, and the like.

The user may set, to be the fullness type, One Side 430 or Both Side 440.

For example, in a case in which the user desires to represent fullness only for a first line of the pattern piece, the user may set One Side 430 to be the fullness type.

For example, when One Side 430 is set to be the fullness type, the processing apparatus may display a measured length 431 of a line segment of a fullness line selected by the user. Here, a length of a line segment may be set in a range from 0.5 mm at a minimum up to 10,000 mm at a maximum, and a unit of a length may be changed by settings set or input by the user. In addition, the processing apparatus may receive, as an input, a setting of a movement distance 433 with respect to the fullness line. For the setting of the movement distance 433, a positive (+) value or a negative value (−) corresponding to a distance to be moved or altered from the length 431 of the line segment of the fullness line may be set based on an intention of the user. A default value of the movement distance 433 with respect to the fullness line may be set to be 0.0.

For another example, in a case in which the user desires to represent fullness for both a first line and a second line, the user may set Both Side 440 to be the fullness type.

For example, when Both Side 440 is set to be the fullness type, the processing apparatus may display a measured length 445 of a line segment of a slash line selected by the user in addition to a measured length 441 of a line segment of a fullness line selected by the user. In this example, the lengths 441 and 445 may be set in a range from 0.5 mm at a minimum up to 10,000 mm at a maximum, and a unit of a length may be changed by settings set or input by the user. In addition, the processing apparatus may receive, as an input, a setting of a movement distance 443 with respect to the fullness line and a setting of a movement distance 447 with respect to the slash line. For the setting of each of the movement distances 443 and 447, a positive (+) value or a negative value (−) corresponding to a distance to be moved or altered from each of the lengths 441 and 445 of each line may be set based on an intention of the user. A default value of the movement distances 443 and 447 may be set to be 0.0.

When the movement distances 443 and 447 with respect to the lengths 441 and 445 are input, the processing apparatus may perform fullness in the direction set through the option item 410 based on the lengths 441 and 445 and the movement distances 443 and 447, and display a result of performing fullness on a screen.

Here, the lengths 441 and 445 may be linked to the movement distances 443 and 447, respectively. Here, that a length is linked to a movement distance may be construed that, in a case in which the length 441 of the line segment of the fullness line is 20 cm and the movement distance 443 is set as +5 cm, a final length of the fullness line may become 25 cm as the movement distance (+5 cm) 443 is applied to the length (20 cm) 441 of the line segment of the fullness line.

In an example, the processing apparatus may change a value of a template such that a ratio between a length of a fullness line and a length of a slash line is maintained, based on settings set or input by a user for a pattern piece. Here, a previous shape of an outer line that is changed by the settings may be left as a basic line on a screen.

FIG. 5 is a diagram illustrating examples of results obtained by varying a direction in which fullness proceeds in a pattern piece based on user settings according to an example embodiment. Referring to FIG. 5, pattern pieces 510 and 530 may be generated based on settings set by a user in an option item, for example, the option item 410 of FIG. 4, for setting a direction in which fullness proceeds in a pattern piece.

For example, referring to FIGS. 4 and 5, the pattern piece 510 may be generated when the user selects Start & End from the direction combo box 415, and the pattern piece 530 may be generated when the user selects Both from the direction combo box 415.

While the pattern piece 510 is generated starting from a start point or an end point, the pattern piece 530 may be generated in both directions from a center axis. Here, lengths of respective lines, movement distances (or distances moved), and directions of the pattern pieces 510 and 530 may be the same.

Figure 6:
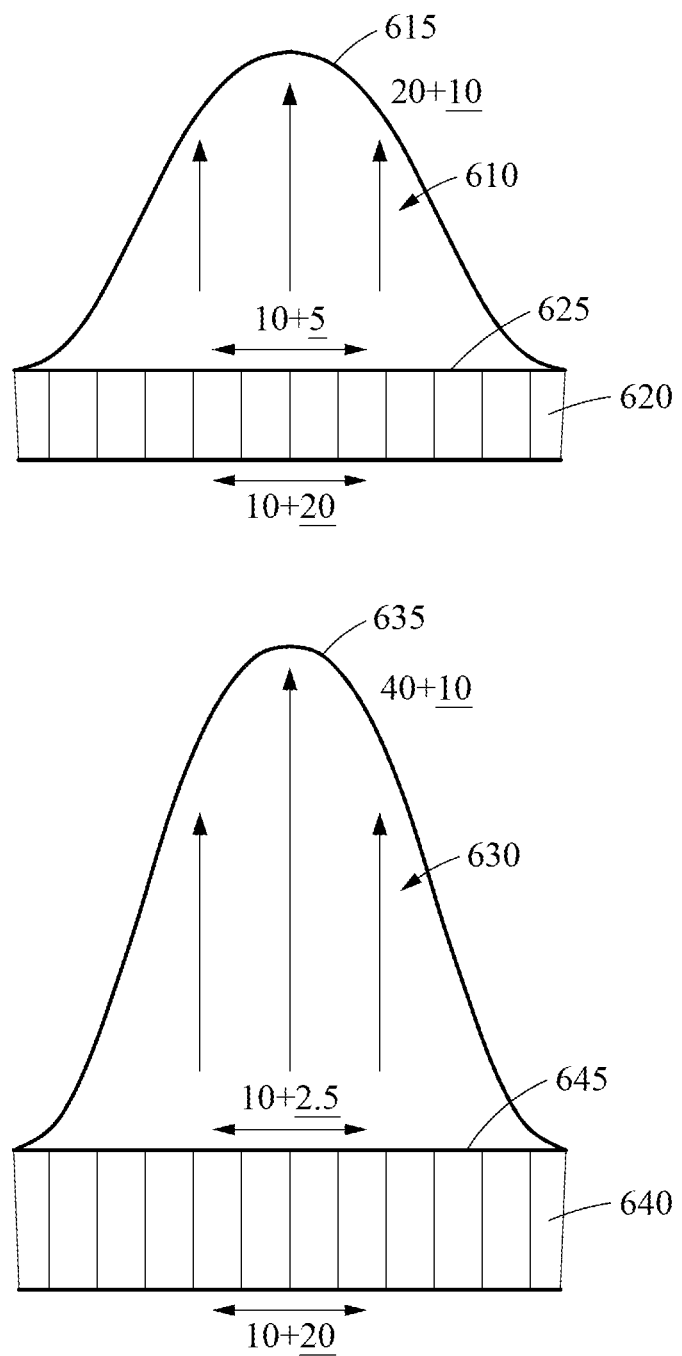
FIG. 6 is a diagram illustrating an example of processing a pattern piece according to an example embodiment.

FIG. 6 is a diagram illustrating an example of processing a template according to an example embodiment. In the example of FIG. 6, illustrated are pattern pieces 610 and 630, and temporary guides 620 and 640 processed based on settings set by a user for the pattern pieces 610 and 630.

In the example of FIG. 6, numerals indicate lengths of lines selected by the user, and underlined numerals indicate movement distances or distances moved with respect to the lengths of the lines set by the user.

As described above with reference to FIGS. 3A and 3B, a processing apparatus may process a template by applying fullness settings set by the user to lines included in the template.

The processing apparatus may process a pattern piece by additionally arranging, in the pattern piece, a polygon for fullness based on the lines of the template to which the fullness settings are applied. The polygon may be, for example, a triangle, or a tetragon such as a trapezoid. However, examples of which are not limited thereto.

For example, the processing apparatus may process the template by adjusting a width between pieces of the template such that a ratio between a length of a first line of the pattern piece and a length of a third line of a temporary guide corresponding to the first line of the pattern piece is maintained, based on the settings set by the user.

For example, as illustrated, a length of a first line 615 selected by the user from the pattern piece 610 is 20 cm, and a movement distance set by the user with respect to the first line 615 is 10 cm. A length of a third line 625 of the temporary guide 620 corresponding to the first line 615 of the pattern piece 610 is 10 cm.

In this example, the processing apparatus may process a plurality of lines of a template to increase the length of the third line 625 of the temporary guide 620 by 5 cm based on a ratio (2:1) between the length (20 cm) of the first line 615 of the pattern piece 610 and the length (10 cm) of the third line 625 of the temporary guide 620.

For another example, as illustrated, a length of a first line 635 selected by the user from the pattern piece 630 is 40 cm, and a movement distance set by the user with respect to the first line 635 is 10 cm. A length of a third line 645 of the temporary guide 640 corresponding to the first line 635 of the pattern piece 630 is 10 cm.

In this example, the processing apparatus may process a plurality of lines of a template to increase a length of the third line 645 of the temporary guide 640 by 2.5 cm based on a ratio (4:1) between the length (40 cm) of the first line 635 of the pattern piece 630 and the length (10 cm) corresponding to the temporary guide 640.

Alternatively, the processing apparatus may process the template such that a length ratio between a first line and a second line of a pattern piece is maintained based on the settings set by the user.

Figure 7:
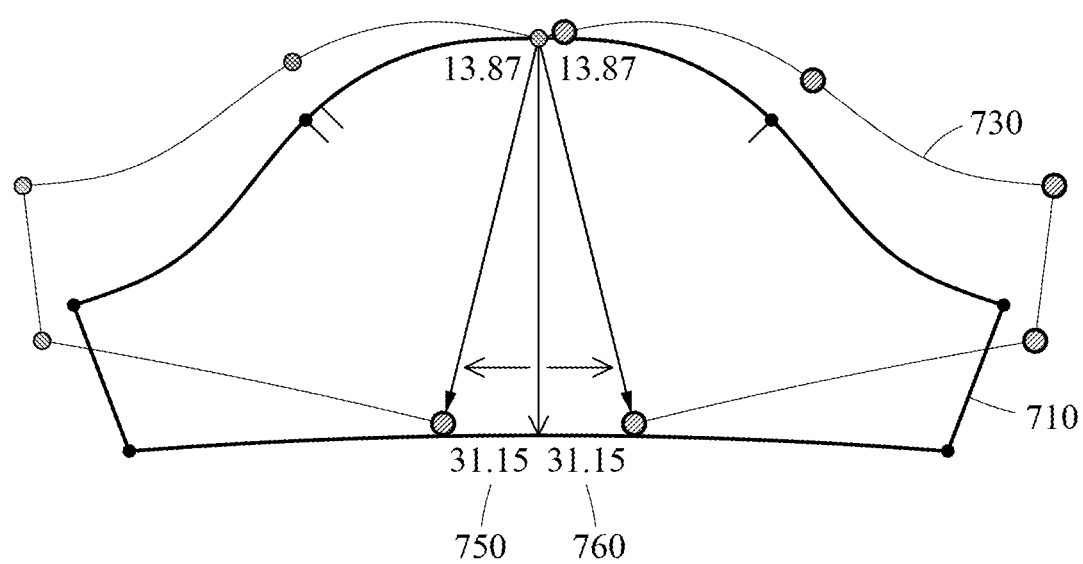
FIG. 7 is a diagram illustrating another example of processing a pattern piece according to an example embodiment.

FIG. 7 is a diagram illustrating another example of processing a pattern piece according to an example embodiment. In the example of FIG. 7, illustrated is a pattern piece 730 processed from a pattern piece 710 based on user settings.

For example, a user may process the pattern piece 710 into the pattern piece 730 by directly drawing a slash line on the pattern piece 710 through a UI or by clicking an internal line or a basic line of the pattern piece 710.

In a case in which the user clicks the slash line on the pattern piece 710, the pattern piece 710 may spread on both sides from the internal line. Here, when the user makes a right-click of a mouse while moving a cursor, a spread window may be displayed on a screen, and the user may then input a movement distance and a rotation angle of the slash line through the spread window. A processing apparatus may process the pattern piece 710 into the pattern piece 730 by applying the movement distance and the rotation angle input by the user to the pattern piece 710 as indicated by reference numerals 750 and 760.

Figure 8:
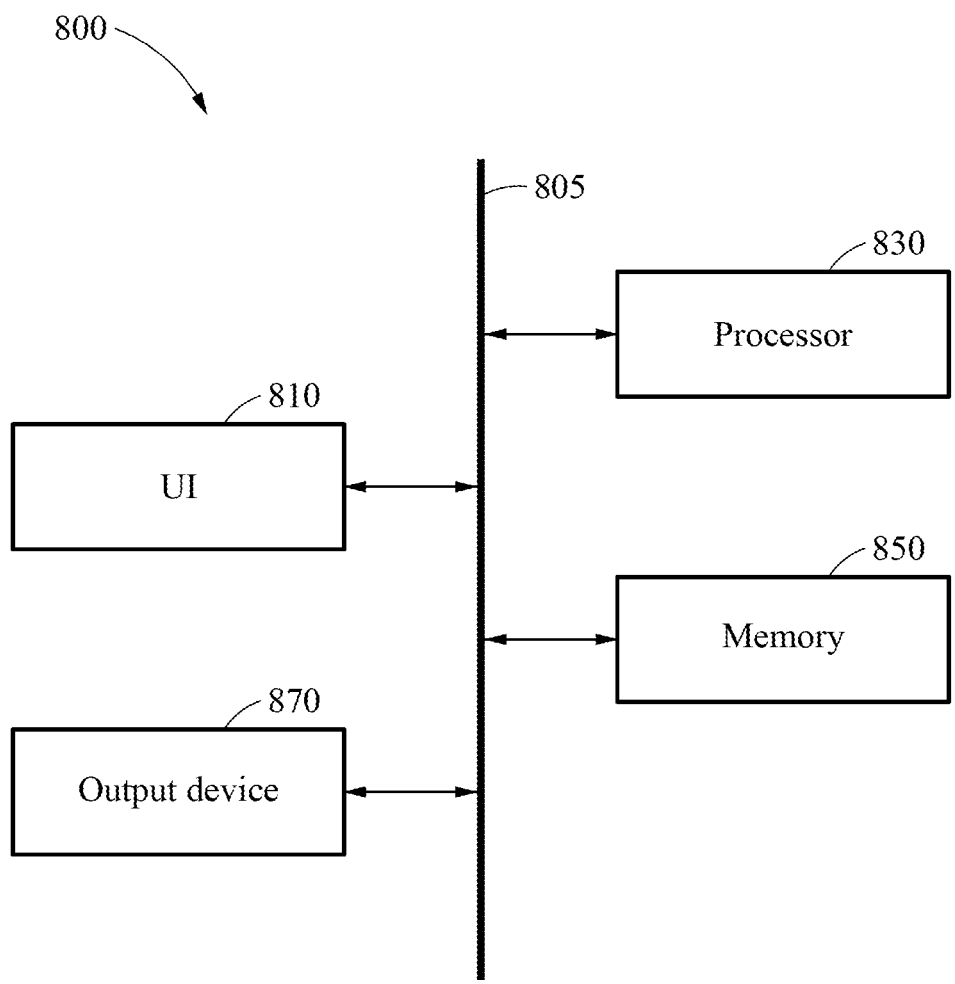
FIG. 8 is a diagram illustrating an example of an apparatus for processing a pattern piece according to an example embodiment.

FIG. 8 is a diagram illustrating an example of a processing apparatus according to an example embodiment. Referring to FIG. 8, a processing apparatus 800 includes a UI 810, a processor 830, and an output device 870. The processing apparatus 800 further includes a memory 850. The UI 810, the processor 830, the output device 870, and the memory 850 may communicate with one another through a communication bus 805.

The UI 810 may receive, as an input from a user, a selection made with respect to a pattern piece to be processed among a plurality of pattern pieces included in a 2D pattern of clothes. The UI 810 may receive, as an input, fullness settings set by the user for the pattern piece. For example, the UI 810 may receive an input through, for example, a stylus pen, a mouse, and a keyboard, a touch input through a touch interface, or an input through a virtual keyboard.

The UI 810 may receive, as an input from the user, a first line corresponding to a first side of the pattern piece, at least two first points on the first line, a second line corresponding to a second side of the pattern piece, and at least two points on the second line, which are all selected by the user.

The processor 830 may generate a template based on the first points and the second points input through the UI 810. For this, the processor 830 may generate a temporary guide of a tetragonal shape formed by the first points and the second points input through the UI 810. The processor 830 may generate dividing lines by repeatedly dimidiating the temporary guide until a width of each of pieces of the temporary guide is not less than a preset length, and generate a plurality of lines included in the template by fitting the dividing lines to an outer line of the pattern piece.

The processor 830 may process the template based on the fullness settings input by the user through the UI 810. The processor 830 may process the pattern piece based on the processed template.

The processor 830 may determine the outer line of the processed pattern piece, based on the lines of the template to which the settings set by the user are applied.

The memory 850 may store, for example, the pattern piece selected through the UI 810 and the settings set by the user for the pattern piece. The memory 850 may store the template generated by the processor 830. In addition, the memory 850 may store a 2D pattern including the processed pattern piece obtained through the processing of the processor 830.

The output device 870 may output the processed pattern piece obtained through the processing of the processor 830. The output device 870 may output the processed pattern piece onto a screen, or output the processed pattern piece to the outside of the processing apparatus 800. The output device 870 may be, for example, a display, or a communication interface that communicates with the outside of the processing apparatus 800. In addition, the output device 870 may be a pattern generating apparatus configured to output a 2D target pattern onto a sheet of paper or fabric.

In addition, the processor 830 may perform one or more, or all, of the methods described above with reference to FIGS. 1 through 7, or algorithms corresponding to the methods. The processor 830 may execute a program and control the processing apparatus 800. A code of the program to be executed by the processor 830 may be stored in the memory 850. The processor 830 may be embodied by a central processing unit (CPU), a graphics processing unit (GPU), or a neural processing unit (NPU), for example.

According to example embodiments described herein, it is possible to apply fullness set by a user to a pattern piece corresponding to at least a portion of clothes, for example, a lower end of a skirt and a cuff.

According to example embodiments described herein, it is possible to represent fullness in an entirety or a middle of a line on at least a side of a pattern piece according to user settings, or output a pattern piece processed by adding or reducing a line for fullness according to user settings.

According to example embodiments described herein, it is possible to apply and/or represent fullness in various directions, for example, in a left direction, in a right direction, and in both directions, according to user settings.

According to example embodiments described herein, by processing a pattern piece based on a template generated based on an outer line of at least a portion selected by a user from the pattern piece, it is possible to provide a pattern piece representing fullness in which an intention of the user is more accurately reflected.

According to example embodiments described herein, by providing a preview of a shape of a pattern piece corresponding to a processed template before processing the pattern piece, it is possible to allow a user to verify a shape of a pattern piece to be finally obtained through the processing.

According to example embodiments described herein, by visually displaying an outer shape (e.g., line, dot, shape) of a pattern piece on a screen in a form of a preview before processing the pattern piece into a final pattern piece, it is possible to alter the pattern piece to be more suitable to fullness intended by a user.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of processing a pattern piece, comprising:
   receiving, as an input from a user, a selection of at least a portion of an outer line of a pattern piece to be processed among one or more pattern pieces included in a two-dimensional (2D) pattern of clothes;
   generating a template including a plurality of lines that divide an area set in the pattern piece by the input;
   processing the template based on settings of fullness for the pattern piece received from the user, the fullness representing a degree of inflating of a portion or entirety of the clothes corresponding to the pattern piece; and
   processing the pattern piece based on the processed template
   by at least determining a rotation value of the lines based on the fullness settings and processing the lines based on the rotation value.

2. The method of claim 1, further comprising:
   determining a scale value of the lines based on the fullness settings.

3. The method of claim 2, wherein the determining of the scale value comprises:
   determining, to be the scale value, a smaller value between a first setting of the fullness settings for processing a first side of the area and a second setting of the fullness settings for processing a second side of the area,
   wherein the determining of the rotation value comprises:
   determining, as the rotation value, a difference between the scale value and a greater value between the first setting and the second setting.

4. The method of claim 3, wherein the processing of the lines comprises:
   adjusting an interval between the lines based on the scale value; and
   rotating the lines based on the rotation value using, as a pivot point, end points of a side corresponding to the smaller value between the first setting and the second setting.

5. The method of claim 1, wherein the generating of the template comprises:
   generating a temporary guide based on the input;
   dividing the temporary guide; and
   generating the lines included in the template by adjusting dividing lines that divide the temporary guide to be suitable to an outer shape of the pattern piece.

6. The method of claim 1, wherein the receiving of the input comprises:

receiving, as an input from the user, a selection of at least two first points of a first line corresponding to a first side of the pattern piece; and receiving, as an input from the user, a selection of at least two second points of a second line corresponding to a second side of the pattern piece.

7. The method of claim 3, wherein the first side and the second side are sides facing each other in the pattern piece.

8. The method of claim 5, wherein the dividing of the temporary guide comprises:

dimidiating the temporary guide repeatedly until a width of each of pieces of the temporary guide becomes greater than or equal to a preset length.

9. The method of claim 1, wherein the processing of the pattern piece comprises:

determining an outer line of the processed pattern piece based on end points of lines included in the processed template.

10. The method of claim 1, wherein the fullness settings comprise at least one of:

a length of a first line of the pattern piece;

a first movement distance with respect to the length of the first line;

a length of a second line of the pattern piece;

a second movement distance with respect to the length of the second line; or a direction in which fullness is applied to the pattern piece.

11. The method of claim 10, wherein the length of the first line is linked with the first movement distance, and the length of the second line is linked with the second movement distance.

12. The method of claim 1, further comprising:

providing a preview of a shape of the processed pattern piece to be obtained through the processing, before determining the processing of the pattern piece.

13. The method of claim 1, wherein the pattern piece is modeled with a polygon mesh including a plurality of polygons.

14. A non-transitory computer-readable storage medium storing instructions that, when executed by a processor, cause the processor to:

receive, as an input from a user, a selection of at least a portion of an outer line of a pattern piece to be processed among one or more pattern pieces included in a two-dimensional (2D) pattern of clothes;

generate a template including a plurality of lines that divide an area set in the pattern piece by the input;

process the template based on settings of fullness for the pattern piece received from the user, the fullness representing a degree of inflating of a portion or entirety of the clothes corresponding to the pattern piece; and process the pattern piece based on the processed template by at least determining a rotation value of the lines based on the fullness settings and processing the lines based on the rotation value.

15. An apparatus for processing a pattern piece, comprising:

a user interface (UI) configured to receive, as an input from a user, a selection of at least a portion of an outer line of a pattern piece to be processed among one or more pattern pieces included in a two-dimensional (2D) pattern of clothes;

processor configured to generate a template including a plurality of lines that divides an area set in the pattern piece by the input, process the template based on settings of fullness set by the user for the pattern piece, and process the pattern piece based on the processed template, the fullness representing a degree of inflating of a portion or entirety of the clothes corresponding to the pattern piece; and an output device configured to output the processed pattern piece, wherein, for the processing of the template, the processor is configured to determine a rotation value of the lines based on the fullness settings and process the lines based on the rotation value.

16. The apparatus of claim 15, wherein the processor is further configured to determine a scale value of the lines based on the fullness settings.

17. The apparatus of claim 16, wherein the processor is configured to:

determine, to be the scale value, a smaller value between a first setting of the fullness settings for processing a first side of the area and a second setting of the fullness settings for processing a second side of the area; and determine, to be the rotation value, a difference between the scale value and a greater value between the first setting and the second setting.

18. The apparatus of claim 17, wherein the processor is configured to:

adjust an interval between the lines based on the scale value; and rotate the lines based on the rotation value using, as a pivot point, end points of a side corresponding to the smaller value between the first setting and the second setting.

19. The apparatus of claim 15, wherein, for the generating of the template, the processor is configured to:

generate a temporary guide based on the input;

divide the temporary guide; and generate the lines included in the template by adjusting dividing lines that divide the temporary guide to be suitable to an outer shape of the pattern piece.

20. The apparatus of claim 19, wherein the processor is configured to:

dimidiate the temporary guide repeatedly until a width of each of pieces of the temporary guide becomes greater than or equal to a preset length.

* * * * *